United States Patent Office 3,116,217
Patented Dec. 31, 1963

3,116,217
PRODUCTION OF CEPHALOSPORIN C BY FERMENTATION
Arnold L. Demain, Westfield, N.J., assignor to Merck & Co., Inc., Rahway, N.J., a corporation of New Jersey
No Drawing. Filed July 2, 1962, Ser. No. 207,092
6 Claims. (Cl. 195—36)

This invention relates to the formation of cephalosporin C antibiotics and, more particularly, it relates to the biosynthesis of cephalosporin C in a synthetic fermentation medium containing norvaline (hereinafter referred to as "NV") or norleucine (hereinafter referred to as "NL") as stimulatory additives.

Cephalosporin C is a well-known antibiotic which is produced by fermentation of a suitable culture-containing medium. It has been desired for some time to provide a new and improved fermentation broth in which the production of cephalosporin C is at an optimum. While the chemical compound methionine has been used for this purpose with some degree of success in the past, it has still remained for the art to provide even more stimulatory additives. What is described herein is an improved biosynthetic fermentation medium for the production of cephalosporin C in which there is present an additional constituent which, either alone or in combination with each other enables the production of cephalosporin C in even greater yields than have hitherto been achieved. In accordance with the invention, these compounds are NV and NL. Generally these compounds are added in the form of a DL mixture, although the individual D- and L-isomers also may be used, with the D-isomers being somewhat more active than the corresponding L-form.

The microorganism used in the fermentation broth of the present invention has been deposited in the American Type Culture Collection and has been given the designation ATCC No. 11,550.

The fermentation starts out by first growing a slant culture of the microorganism, then developing a vegetative inoculum from the slant culture and, finally, adding the inoculum to a suitable fermentation medium containing the stimulatory additives.

Suitable culture slants of the microorganism may be prepared on the following culture medium:

| Constituent— | Amount (g./l.) |
|---|---|
| $NaNO_3$ | 3 |
| $K_2HPO_4$ | 1 |
| $MgSO_4.7H_2O$ | 0.5 |
| KCl | 0.5 |
| $FeSO_4.7H_2O$ | 0.01 |
| Lactose | 50 |
| Agar | 20 |

The cultures are prepared by growth on slants of the culture medium at 28° C. for a period of about 3 weeks and stored under refrigeration until use. An inoculum for the culture then is made by first scraping off the growth on each slant with 3 ml. of sterile water. 1 ml. of the suspension is then added to a flask containing 40 ml. of any one of the following media:

| Constituent | Amount (g./l.) | | |
|---|---|---|---|
| | Medium A | Medium B | Medium C |
| $KH_2PO_4$ | 15.3 | 15.3 | 15.3 |
| $K_2HPO_4$ | 21.0 | 21.0 | 21.0 |
| $Na_2SO_4$ | 0.75 | 0.75 | 0.75 |
| $MgSO_4$ | 0.18 | 0.18 | 0.18 |
| $ZnSO_4.7H_2O$ | 0.03 | 0.03 | 0.03 |
| $MnSO_4.H_2O$ | 0.03 | 0.03 | 0.03 |
| $CuSO_4.5H_2O$ | 0.0075 | 0.0075 | 0.0075 |
| $CaCl_2$ | 0.057 | 0.057 | 0.057 |
| $Fe(NH_4)_2(SO_4)_2.6H_2O$ | 0.15 | 0.15 | 0.15 |
| $(NH_4)_2SO_4$ | 7.5 | 7.5 | 7.5 |
| Sucrose | 36.0 | 36.0 | 36.0 |
| Glucose | 27.0 | 27.0 | 27.0 |
| Oleic acid | 0.9 | 0.9 | 0.9 |
| DL-Methionine | | 5.0 | |
| L-Cysteine-HCl | | | 1.6 |
| pH | 7.3–7.5 | 7.3–7.5 | 7.3–7.5 |

The inoculum then is developed for 4 or 5 days at 28° C. on a rotary shaker at 220 r.p.m. The inoculum thus produced is used for making cephalosporin C in one of the above mediums A or C in which is contained a suitable quantity of the stimulatory additives NV or NL.

The fermentation baths of the present invention are prepared by first mixing the constituents of the fermentation medium and diluting with water to a liter of solution. Then 10 ml. portions of the solution are removed for each individual run and the desired quantity of NV or NL is added. The solution then is inoculated with 0.25 ml. of the inoculum to form the fermentation bath which is shaken at 28° C. at 220 r.p.m. for 5 days.

Microbiological assays for cephalosporin C are made on the centrifuged broth using an agar-disc technique. Penicillinase is included in the agar to destroy any cephalosporin N which is produced. The assay organism is *Escherichia coli* M.B. 208. Assays are in terms of the production of the sodium salt of cephalosporin C.

The effect of the presence of NV and NL in the fermentation broth is dramatically illustrated in the following experimental results presented in the tables below:

Table I

| Medium: | Amt. of Ceph. C ($\gamma$/ml.) produced |
|---|---|
| C | 150 |
| C+1 mg. NL | 220 |
| C+10 mg. NL | 290 |
| C+20 mg. NL | 330 |
| C+30 mg. NL | 300 |
| C+50 mg. NL | 290 |

As shown in Table I above, the presence of NL in the fermentation medium results in an improvement of up to 100% in the amount of cephalosporin C which is produced. An optimum production of cephalosporin C is reached when 20 mg./10 ml. of solution is added.

Table II

| Medium: | Amt. of Ceph. C ($\gamma$/ml.) produced |
|---|---|
| A | 160 |
| A+10 mg. NL | 270 |
| A+20 mg. NL | 310 |
| A+30 mg. NL | 330 |
| A+50 mg. NL | 300 |

The results in Table II illustrate the improvement in yield of cephalosporin C in Medium A. As is shown, more than double the yield of cephalosporin C is obtained when 30 mg./10 ml. of solution of NL is added as compared to a bath which does not contain any NL.

*Table III*

| Medium: | Amt. of Ceph. C ($\gamma$/ml.) produced |
|---|---|
| C | 120 |
| C+10 mg. NV | 180 |
| C+20 mg. NV | 190 |
| C+30 mg. NV | 200 |
| C+40 mg. NV | 180 |

The improvement in production of cephalosporin C in a fermentation bath containing NV is illustrated in Table III above. A more nearly optimum result is obtained at 30 mg./10 ml. of solution.

What has been described herein is a method for improving the yield of cephalosporin C by fermentation. While the invention has been described with reference to certain embodiments thereof, certain modifications and additions may be made which are within the skill of the art.

What is claimed is:

1. In a method for improving the yield of cephalosporin C by fermentation with a cephalosporin C producing microorganism the step which comprises adding to the fermentation medium a compound selected from the group consisting of norvaline and norleucine.

2. In a method for improving the yield of cephalosporin C by fermentation with a cephalosporin C producing microorganism the step which comprises adding norvaline to the fermentation medium.

3. In a method for improving the yield of cephalosporin C by fermentation with a cephalosporin C producing microorganism the step which comprises adding norleucine to the fermentation medium.

4. In a method for improving the yield of cephalosporin C by fermentation with a cephalosporin C producing microorganism the step which comprises adding to a fermentation medium a compound selected from the group consisting of norvaline and norleucine.

5. In a method for improving the yield of cephalosporin C by fermentation with a cephalosporin C producing microorganism the step which comprises adding to the fermentation medium a mixture of the compounds norvaline and norleucine.

6. In a method for improving the yield of cephalosporin C by fermentation with a cephalosporin C producing microorganism the step which comprises adding to the fermentation medium a mixture of about 30 mg. each of the compounds norvaline and norleucine.

References Cited in the file of this patent

UNITED STATES PATENTS

| 2,831,797 | Miller et al. | Apr. 22, 1958 |
| 2,883,328 | Florey et al. | Apr. 21, 1959 |